United States Patent [19]
Kunderman

[11] 3,915,459
[45] Oct. 28, 1975

[54] TURBO-MACHINERY SEAL
[75] Inventor: Fred K. Kunderman, Olean, N.Y.
[73] Assignee: Dresser Industries, Inc., Dallas, Tex.
[22] Filed: May 13, 1974
[21] Appl. No.: 469,561

[52] U.S. Cl. .................... 277/27; 277/75; 308/36.3
[51] Int. Cl.² ......................................... F16J 15/34
[58] Field of Search ................ 277/27, 75; 308/36.3

[56] References Cited
UNITED STATES PATENTS
3,756,673   9/1973   Strub .................................... 277/27

*Primary Examiner*—Robert I. Smith
*Attorney, Agent, or Firm*—Roy L. Van Winkle; John N. Hazelwood

[57] ABSTRACT

The improved turbo-machinery seal described herein includes an annular seal body encircling the turbo-machinery rotor shaft and disposed within the housing. The seal body includes a first end arranged to frictionally and sealingly engage a radially disposed face in the housing while the seal is exposed to a pressure fluid that biases the seal body toward the radial face. In one aspect, the seal body is provided with a recess in a portion of the bore adjacent the rotor shaft that is exposed to the pressure fluid providing a biasing force on the seal body in a radial direction. In another aspect, the seal body may be provided with a seal on the outer periphery thereof that engages the housing. The area thus isolated by the seal is vented to a low pressure so that the seal body is biased radially. The purpose of the radial bias on the seal body is to provide the seal with a predetermined direction of force so that predictable results can be obtained with respect to the shaft supporting characteristics of the improved seal.

4 Claims, 4 Drawing Figures

TURBO-MACHINERY SEAL

BACKGROUND OF THE INVENTION

This invention relates generally to improved sealing means for use in turbo-machines or the like. More particularly, but not by way of limitation, this invention relates to an improved sealing means that is responsive to fluid pressure to provide both a fluid seal with the turbo-machine rotor and with the housing and to provide additional shaft support, in effect, stiffening the rotor shaft to provide higher critical speeds.

The desirability for providing a plurality of stages in turbo-machinery has lead to the use of relatively long shafts. In such turbo-machinery, it is desirable to maintain the shaft diameter as small as possible to reduce the inertia of the rotating parts of the machine and, with the relatively long shafts in multistage machines, considerable difficulty has been encountered due to the vibrations that are induced under the relatively long, flexible shafts. Manifestly, it is necessary to maintain shaft stiffness to reduce the vibration as the rotative speed passes through the various critical speeds of the shaft. In view of the present day high shaft operating speed, it is highly desirable to increase the critical speed as much as possible. To further complicate the matter, it is not usually practical in a turbo-machine to install shaft supporting bearings between the bearings located at each end of the shaft housing.

It has been found that the shaft stiffness can be increased some extent by use of seals that are biased by fluid under pressure against the housing so that frictional engagement between the housing and seal occurs. Such forces resist lateral or radial motion of the shaft as it is rotated until the frictional force generated by the pressure is exceeded.

This invention provides an improved seal that functions effectively as a seal, provides additional stiffness to the shaft in a more predictable manner due to the use of means for causing the seal to be biased in a radial direction thus exerting a radial force on the shaft in a predetermined direction.

SUMMARY OF THE INVENTION

The foregoing objects and advantages of the invention are accomplished by the improved seal of this invention. The seal is useful in turbo-machinery that includes a housing, a shaft journaled in the housing and means for applying a fluid pressure in the housing. The seal is located in the housing encircling the shaft and includes an annular seal body having a longitudinal axis generally parallel to the rotor shaft; first and second ends on the body are disposed generally perpendicularly to the axis; and, a bore extending through the ends of the seal that rotatably and sealingly receives the rotor shaft. A surface is provided on the first end of the body that sealingly and frictionally engages the housing. The seal body is exposed to a pressure fluid in the housing whereby the seal is biased axially toward the radial face of the housing and biasing means are provided on the seal body for causing the seal to be biased in a predetermined radial direction in response to the fluid pressure whereby the seal is stabilized providing reproduceable biasing results.

DESCRIPTION OF THE PREFERRED EMBODIMENT

Figure 1:
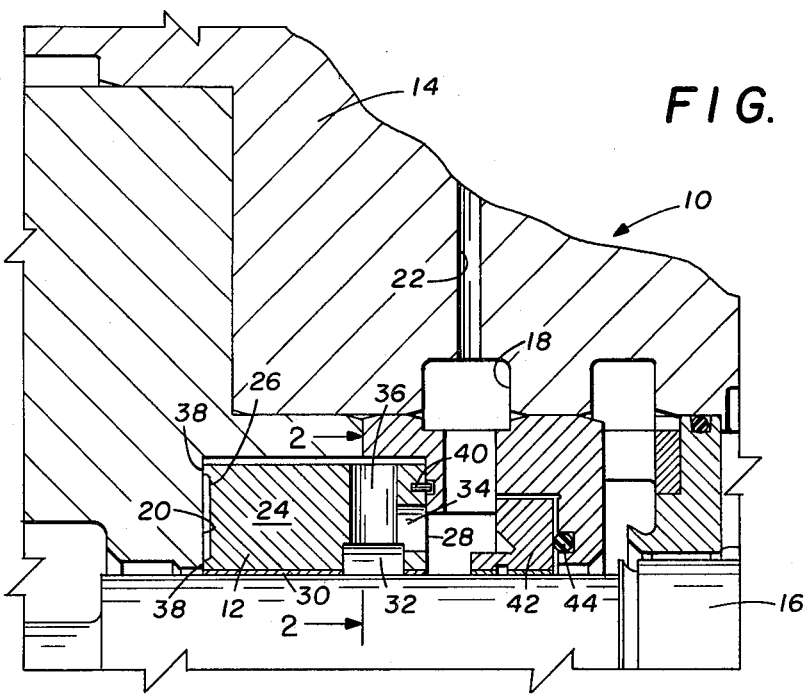
FIG. 1 is a partial, cross sectional view of the turbo-machine including an improved seal that is constructed in accordance with the invention.

Referring to the drawing and to FIG. 1 in particular, shown therein and generally designated by the reference character 10 is a turbo-machine incorporating a seal 12 that is constructed in accordance with the invention. Only one seal 12 is illustrated, but it will be understood that an additional seal 12 will be provided at the other end of the shaft 16. The turbo-machine 10 includes a housing 14 having a rotor shaft 16 journaled therein. It will be noted that FIG. 1 is a partial, cross sectional view and does not illustrate the rotors that are carried by the shaft 16 nor does it illustrate the bearings that support the shaft 16 in the housing 14.

The housing 14 is hollow having a cavity 18 therein that provides a radially disposed face 20. For manufacturing and assembly purposes, the housing 14 is composed of a number of components. The various components are unnumbered in the drawing. Extending through the housing 14 is a passageway 22 that permits pressurized fluid, usually a sealing fluid or lubricant to flow through the housing 14 into the cavity 18 for purposes that will become more apparent hereinafter.

Figure 2:
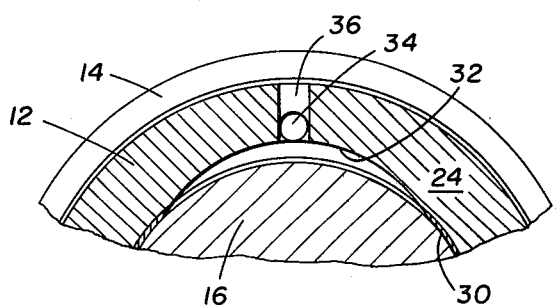
FIG. 2 is a cross sectional view taken along the line 2—2 of FIG. 1.

The seal 12 includes an annular seal body 24 having a first end 26 adjacent the radial face 20 in the housing 14 and a second end 28 disposed in the cavity 18. A bore 30 in the body 24 encircles the rotor shaft 16 in rotating and sealing relationship thereto and extends through the ends 26 and 28. Located in the bore 30 of the body 24 is a recess 32 that is in communication with the cavity 18 via passageways 34 and 36 which extend through the body 24. As may be seen more clearly in FIG. 2, the recess 32 is generally arcuate in configuration and extends along only a portion of the inner periphery of the body 24. The recess 32 may be described as being formed by the outer periphery of a circle having a different diameter and centerline than that of the bore 30. Fluid pressure applied in the cavity 18 of the housing 14 enters the recess 32 via the passageways 34 and 36 exerting a force on the body 24 within the recess 32 tending to bias the seal radially relative to the shaft 16.

Referring again to the first end 26 of the body 24, it can be seen that there are a pair of axially projecting, annular flanges 38 located thereon that sealingly and frictionally engage the face 20 of the housing 14. In view of the sealing engagement of the flanges 38 with the face 20, a differential area is created on the body 24 that is presented to the pressure fluid in the cavity 18. As a result of the differential area, the fluid in the cavity 18 exerts a biasing force on the body 24 tending to force the seal 12 axially biasing the flanges 38 into engagement with the face 20. The amount of force can be varied by changing the pressure or by changing the locations of the flanges 38.

A locator pin 40 extends between the body 24 and the housing 14 to prevent relative rotation between the seal 12 and the housing 14. The pin 40 is located so that the recess 32 is positioned as desired to provide the radial biasing force in a predetermined direction.

To prevent the escape of pressure fluid from the cavity 18, a second or inboard annular seal 42 is provided that rotatingly and sealingly receives the rotor shaft 16. Leakage past the exterior of the seal 42 is prevented by an O-ring 44 that is located in the housing 14 in sealing engagement with the seal 42.

OPERATION OF THE PREFERRED EMBODIMENT

As previously mentioned, the rotor shaft 16 is provided with rotors (not shown) and is journaled by bearings (not shown) that are located at each end of the housing 14. As the shaft 16 rotates, it will have a tendency to flex radially in response to the mass of the shaft and rotors and such flexure will occur in different modes as various critical speeds of shaft 16 are passed as the speed of shaft 16 increases.

To increase the critical speed of the shaft 16, pressure fluid is applied in the cavity 18 acting across the end 28 of the body 24 forcing the seal 12 into tight sealing and frictional engagement with the face 20 of the housing 14. The seal 12 is held in relatively fixed position by such force until the shaft 16 develops forces that are sufficient to overcome the frictional force and cause the seal 24 to move relative to the face 20. As previously mentioned, the frictional force as well as the radial force can be varied by varying the pressure of the fluid in the cavity 18. Thus, if relatively high vibrational forces are anticipated at the shaft operating speed, the pressure can be increased to provide increased frictional and radial forces to stiffen the shaft 16 and raise the critical speed of the shaft. Since the seals 12 are located inboard of the bearings supporting the shaft 16, additional stiffness is added to the shaft 16 due to the force exerted thereon by the seals 12.

It has been found in a series of tests run on seals that are not radially biased, that while the shaft is stiffened, the results are somewhat unpredictable. Thus, adding the recess 32 to the seal 12 with its attendant radially directed force caused by the pressure fluid 18 forces the seal 12 in a predetermined radial direction so that the radial force exerted by the seal 12 on the shaft 16 will stabilize the imposition of the load producing predictable results.

DESCRIPTION OF THE EMBODIMENT OF FIG. 3

Figure 3:
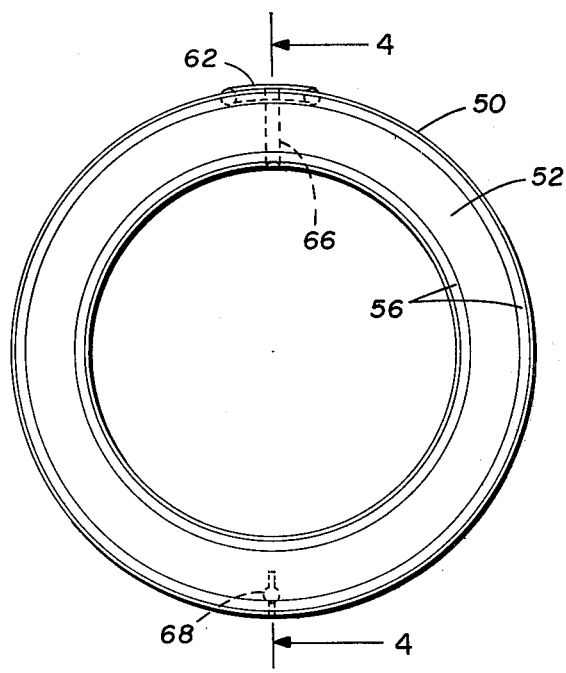
FIG. 3 is an end view of another embodiment of a seal that is also constructed in accordance with the invention.

FIG. 3 illustrates another embodiment of annular seal that is generally designated by the reference character 50. The seal 50 can be substituted into the turbo-machine 10 in lieu of the seal 12 which has been previously described.

Figure 4:
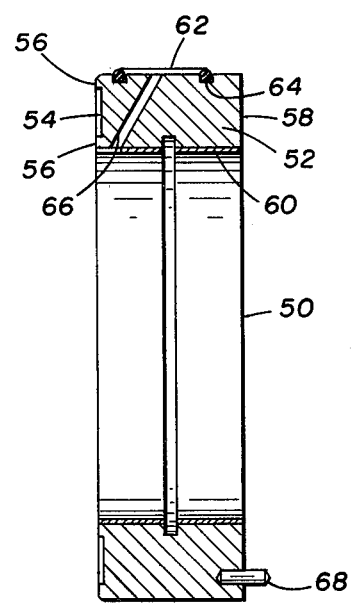
FIG. 4 is a cross sectional view of the seal of FIG. 3 taken along the line 4—4 of FIG. 3.

As shown in FIGS. 3 and 4, the seal 50 includes a seal body 52 having a first end 54 provided with annular, axially extending flanges 56 on the end 54 and having a second end 58. A bore 60 extends through the seal body 52 intersecting the ends 54 and 58. The bore 60 is sized to rotatingly and sealingly receive the shaft 16.

An O-ring or similar seal 62 has been placed in a groove 64 formed on the outer periphery of the seal body 52. The seal 62 is sized to sealingly engage the housing 14 when the seal 50 is installed in the turbo-machine 10. As illustrated, the seal 62 will isolate a small area on the periphery of the seal 50. The isolated area is vented by means of passageway 66 to a low pressure area in the turbo-machine 10. It will be appreciated that the application of the lower pressure to the isolated area will cause the pressure fluid in the cavity 18 to bias the seal 50 upwardly as shown in FIGS. 3 and 4.

A locator pin 68 is illustrated in the seal 52 and serves the function of preventing relative rotation between the body 52 and the housing 14 when the seal 50 is installed in the turbo-machine 10. The pin 68 can be placed wherever desired in order to orient the direction of the biasing force in a predetermined and desired direction.

The operation of the embodiment shown in FIGS. 3 and 4 is essentially the same with the same results as previously described in connection with the seal 12 when installed in the turbo-machinery 10.

From the foregoing detailed descriptions, it will be appreciated that the improved turbo-machinery seals of this invention provide means for stiffening the rotor shaft of the turbo-machinery. Not only do the improved seals of this invention stiffen the shaft, but they also provide predictable results since the radial biasing force can be exerted in a predetermined direction.

The embodiments described in detail hereinbefore are presented by way of example only and it will be understood that many modifications and changes can be made thereto without departing from the spirit or scope of the invention.

The embodiments of the invention in which an exclusive property or privilege is claimed are defined as follows:

1. An improved seal for turbo-machinery or the like that includes a hollow housing having an interior radial face, lubricant means for delivering pressure fluid into the housing, and a rotor shaft journaled in the housing, the improved seal comprising an annular seal body disposed in the housing and having:

a longitudinal axis generally parallel to the rotor shaft;

first and second ends disposed generally perpendicularly to said axis;

a bore extending through said ends for rotatably and sealingly receiving the rotor shaft;

surface means on said first end sealingly and frictionally engaging the radial face of the housing;

said second end being exposed to the pressure fluid whereby said seal is biased axially toward the radial face of the housing;

a biasing means on said body for biasing said seal in a radial direction in response to the pressure fluid, siad biasing means including recess means non-symetrically located in said body adjacent said bore in communication with the pressure fluid whereby said seal is biased radially; and locating means engaging said seal body and said housing for preventing relative rotation between said body and housing whereby the direction of the radial bias can be predetermined.

2. The improved seal of claim 1 wherein said recess is arcuate in configuration and formed by the periphery of a circle of lesser diameter than said bore having a center offset from the centerline of said bore.

3. An improved seal for turbo-machinery or the like that includes a hollow housing having an interior radial face, lubricant means for delivering pressure fluid into the housing, and a rotor shaft journaled in the housing, the improved seal comprising an annular seal body disposed in the housing and having:
- a longitudinal axis generally parallel to the rotor shaft;
- first and second ends disposed generally perpendicularly to said axis;
- a bore extending through said ends for rotatably and sealing receiving the rotor shaft;
- surface means on said first end sealingly and frictionally engaging the radial face of the housing;
- said second end being exposed to the pressure fluid whereby said seal is biased axially toward the radial face of the housing;
- a biasing means on said body for biasing said seal in a radial direction in response to the pressure fluid, said biasing means including sealing means on the periphery of said body sealingly engaging the housing for isolating an area on said periphery and pressure venting means communicating with said isolating area; and locating means engaging said seal body and said housing for preventing relative rotation between said body and housing whereby the direction of the radial bias can be predetermined.

4. The improved seal of claim 3 wherein said venting means is in communication with a space having a pressure lower than said pressure fluid whereby said seal is biased relatively toward said isolated area.

* * * * *